Nov. 10, 1936.  C. W. DAKE  2,060,612
POWER GENERATING AND TRANSMITTING SYSTEM
Filed Nov. 2, 1931  5 Sheets-Sheet 1
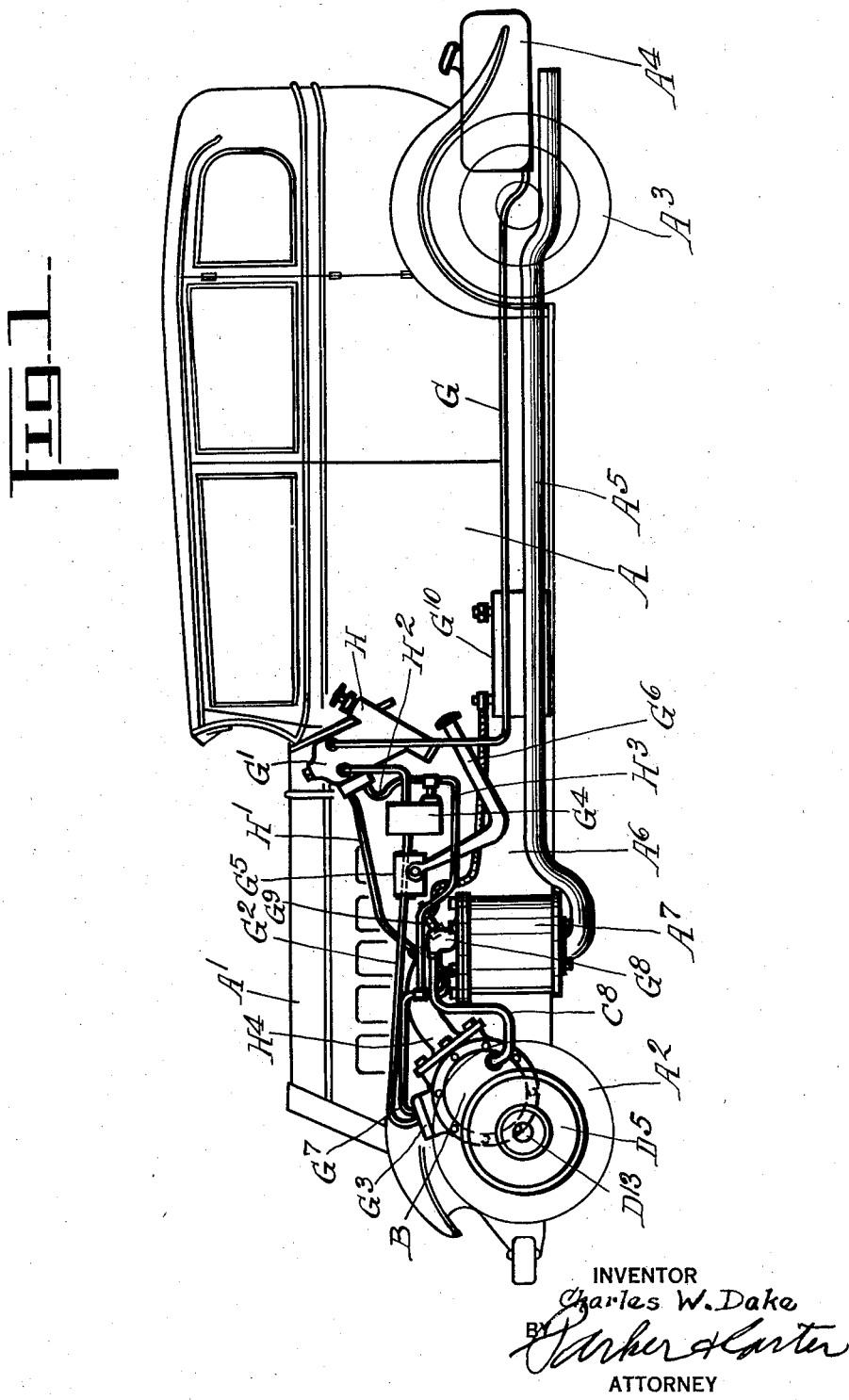
INVENTOR
Charles W. Dake
BY
ATTORNEY

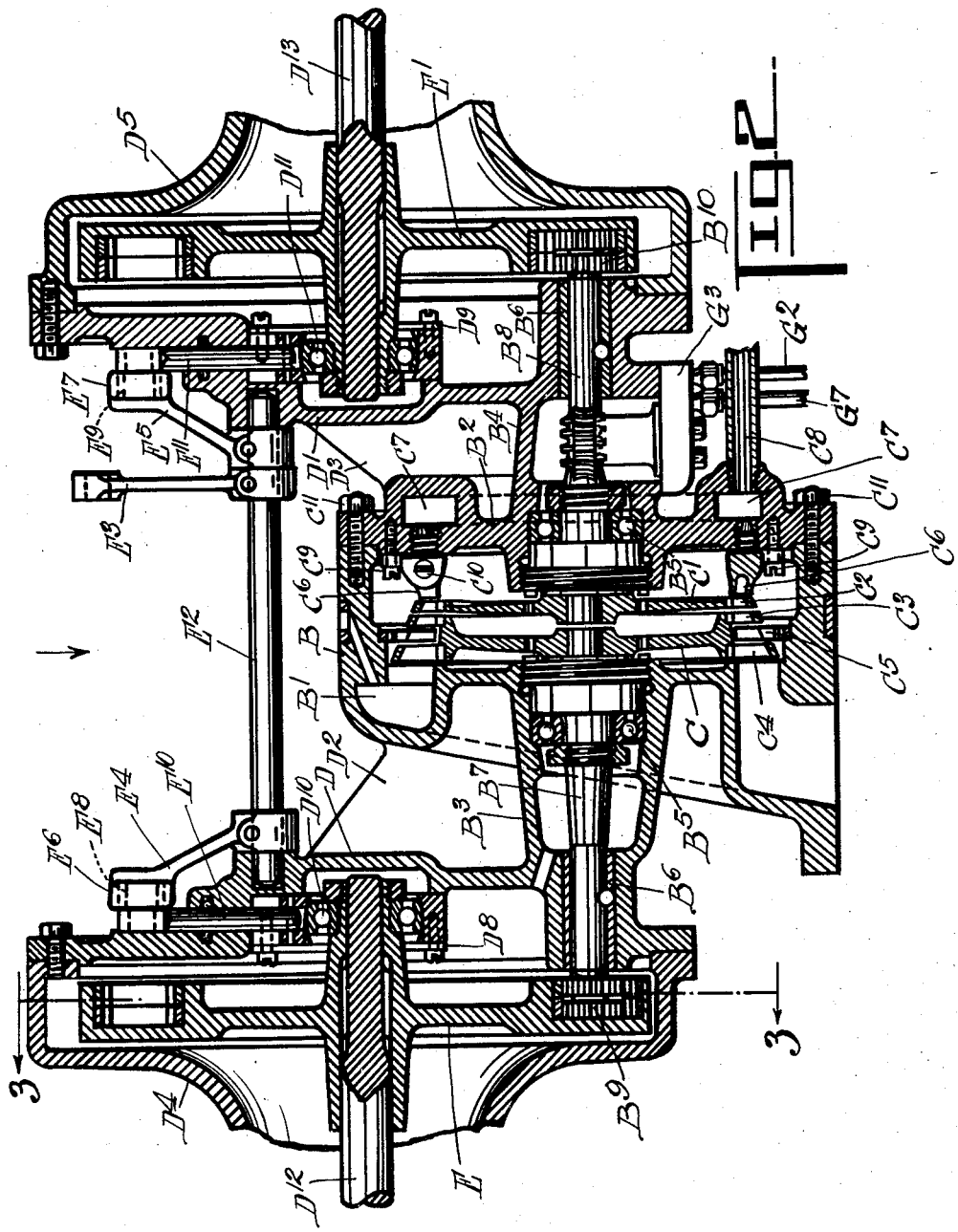

Nov. 10, 1936.  C. W. DAKE  2,060,612
POWER GENERATING AND TRANSMITTING SYSTEM
Filed Nov. 2, 1931  5 Sheets-Sheet 3
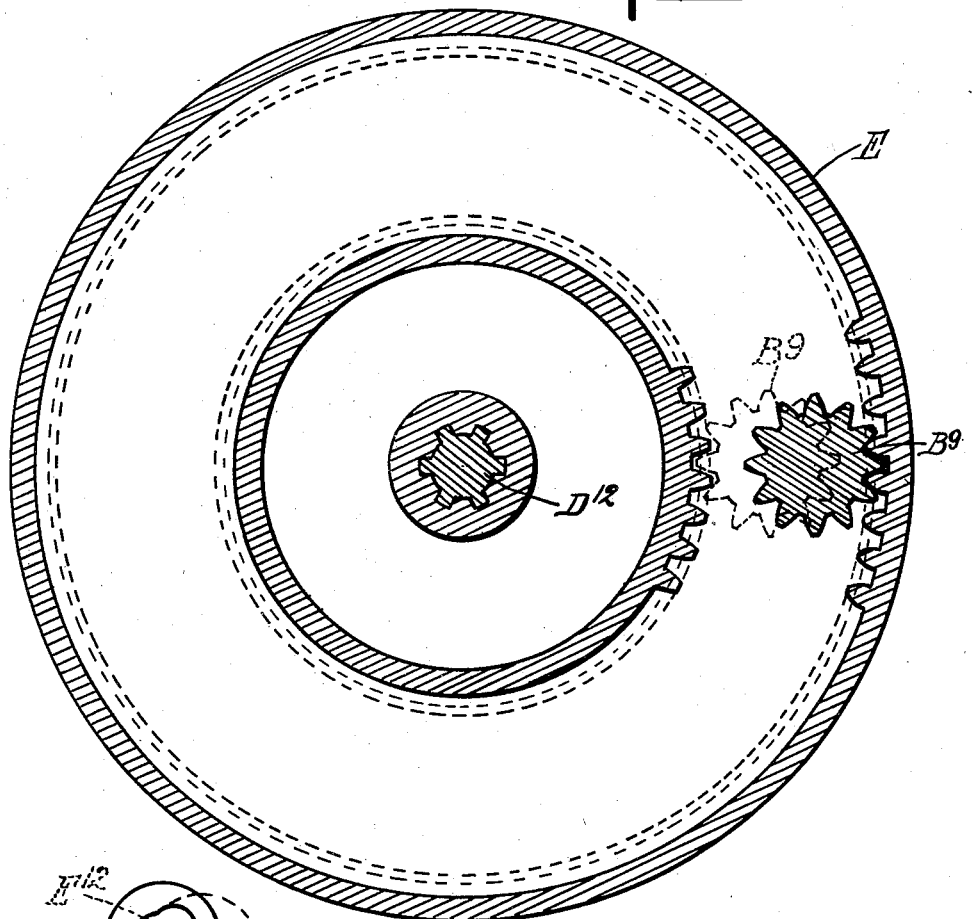
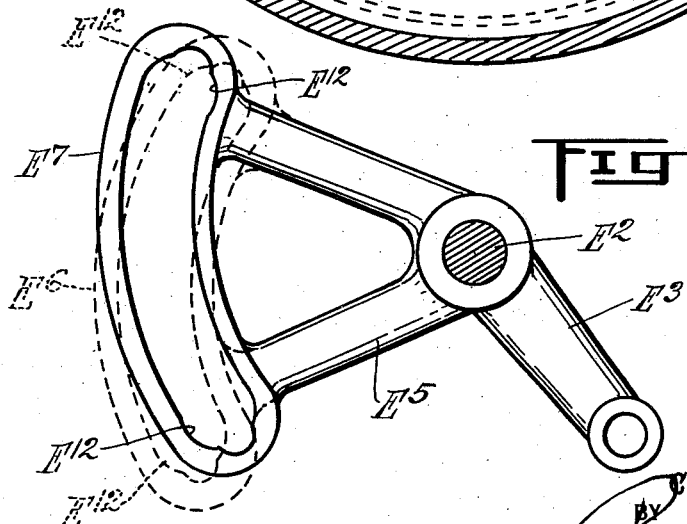
INVENTOR
Charles W. Dake
ATTORNEY

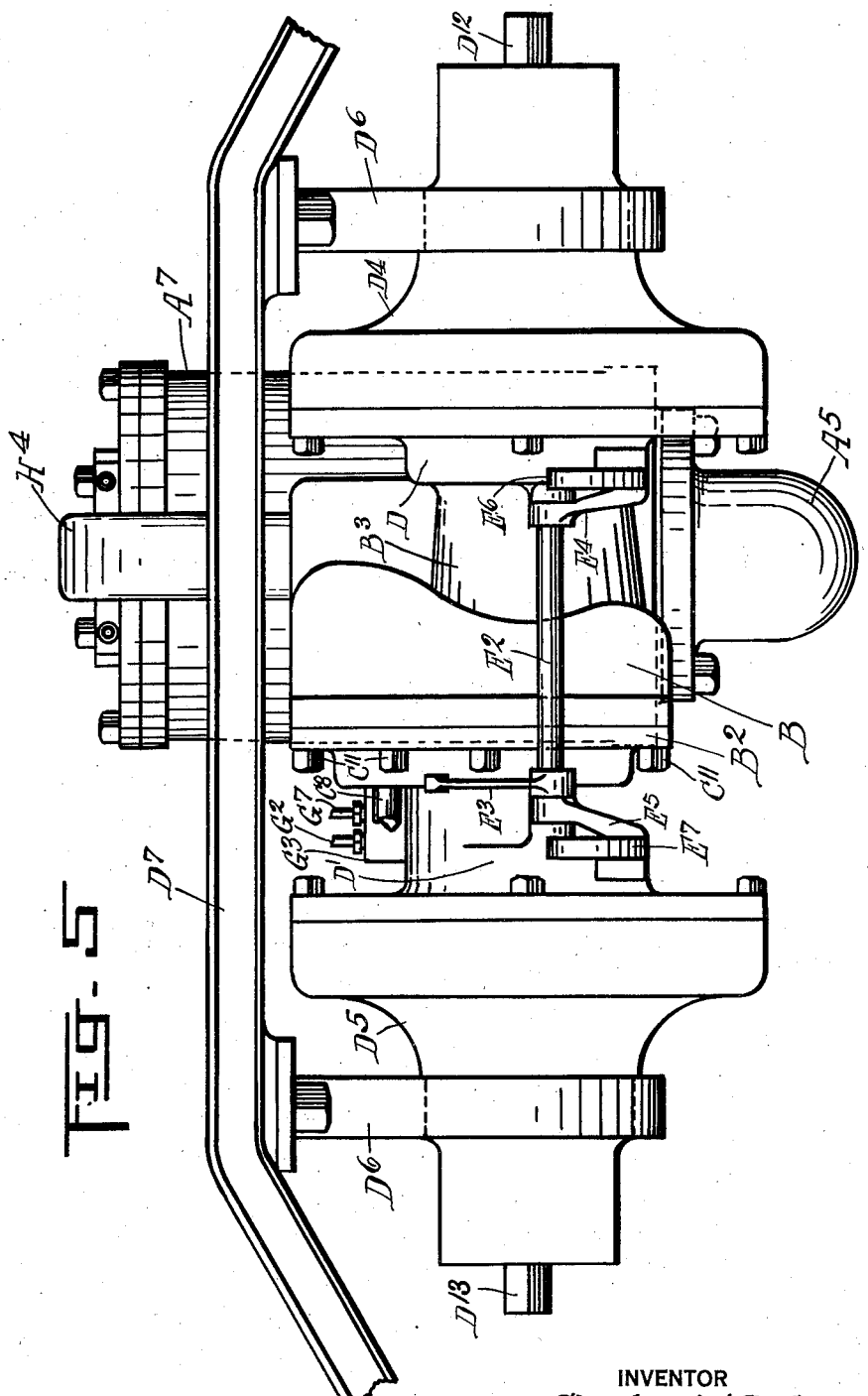

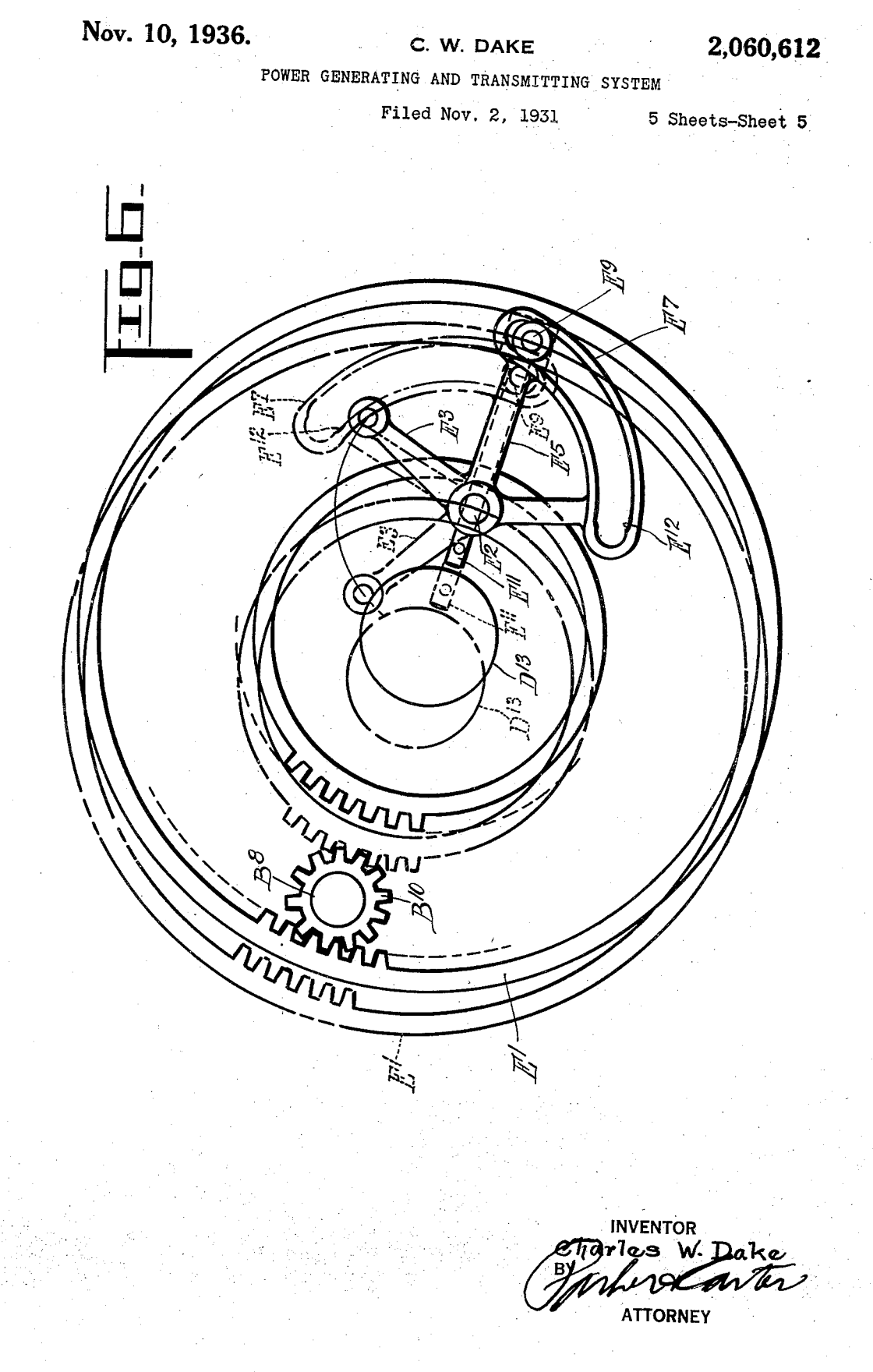

Patented Nov. 10, 1936

2,060,612

UNITED STATES PATENT OFFICE 2,060,612

POWER GENERATING AND TRANSMITTING SYSTEM

Charles W. Dake, Grand Haven, Mich.

Application November 2, 1931, Serial No. 572,718

9 Claims. (Cl. 180—66)

My invention relates to improvements in power generating and transmitting system and has for one object to provide in combination with an elastic fluid turbine, means for transmitting and controlling power therefrom. Another object of my invention is to provide such means in connection with an automotive vehicle. Another object of my invention is to provide means in combination with an elastic fluid turbine for reversing the drive. Another object is to provide in connection with a multi-wheel elastic fluid turbine, means for separately utilizing the power from each wheel. Another object is to provide an elastic fluid turbine having a plurality of mechanically independent bucket wheels adapted for operation in unison. Other objects will appear from time to time throughout the specification and claims.

My invention is illustrated more or less diagrammatically in the accompanying drawings where it is applied for purposes of illustration to an automobile vehicle, wherein Figure 1 is a diagrammatic side elevation of an automotive vehicle with parts omitted for the sake of clearness;

Figure 2 is a horizontal section through the turbine and drive mechanism;

Figure 3 is a section along the line 3—3 of Figure 2;

Figure 4 is a detail side elevation of one of the direction controlling cams;

Figure 5 is a side elevation viewed in the direction of the arrow shown on Figure 2 of the drive mechanism;

Figure 6 is a diagrammatic showing of the relation between the cams and the gears showing the position for forward and reverse.

Like parts are indicated by like characters throughout the specification and drawings.

An automotive vehicle having a body A, a hood $A^1$, front driving wheels $A^2$, rear idler wheels $A^3$, fuel tank $A^4$, exhaust pipe $A^5$, frame $A^6$, carries the power plant or power generating and transmitting system underneath the hood, driving through the front wheels though obviously the drive might be through the rear wheels if desired. Figure 1 is provided to show the location and application of my power plant but obviously the power generating and transmitting system might be applied in whole or in part in many other circumstances and for many other purposes. $A^7$ is a pressure generator which supplies motive fluid under pressure to the elastic fluid turbine which delivers the power as will hereinafter appear.

The turbine which in my invention generates power comprises a generally cylindrical drum B open on one side. The opposed integral closed side contains the annular expanding exhaust passage or chamber $B^1$. The open side of the housing is closed by a removable cover plate $B^2$. Projecting centrally from both the integral closed end and the removable cover plate of the housing are hubs $B^3$ $B^4$. Each of these hubs carries ball bearings $B^5$, and sleeve bearings $B^6$. Mounted in each of these bearings is a turbine shaft $B^7$ $B^8$, which turbine shafts on their outboard ends carry driving pinions $B^9$ $B^{10}$.

The two shafts $B^7$ $B^8$ each terminate inside the turbine housing and each at its inner end carries a turbine wheel C $C^1$. The turbine wheel $C^1$ is the high pressure wheel and has only one row of buckets $C^2$ thereon. The wheel C is the low pressure wheel and has intermediate stage buckets $C^3$ and low pressure buckets $C^4$. Guide passages $C^5$ are carried on the turbine housing and project inwardly between the bucket rows $C^3$ $C^4$. The buckets $C^2$ receive elastic motive fluid from the nozzles $C^6$ and the force of the fluid causes rotation of the wheel. The fluid leaving this wheel impinges upon the buckets $C^3$ to cause rotation of the wheel C in the opposite direction. The motive fluid as it leaves the bucket $C^3$ strikes the guide passages $C^5$ and is deflected back upon the bucket $C^4$ so that on the low pressure wheel, the motive fluid having lower pressure and lower velocity has twice as many buckets upon which to work. The two shafts then rotate in opposite directions and independently but of course are driven by the same motive fluid. Elastic motive fluid is supplied to the nozzle $C^6$ from the annular chamber $C^7$ reaching such chamber in the removable turbine wall through the supply pipe $C^8$ from the generator $A^7$. It will be understood that the nozzles are threaded, as indicated, in the wall of the housing being held in place by lock screws $C^9$, $C^{10}$ being a clean out plug whereby scale and incrustation in the nozzles may be removed. The turbine casing is assembled by bringing the removable cover plate with its nozzles into register with the turbine housing and fastening the parts together by means of the nuts and bolts $C^{11}$.

Each of the hubs $B^3$ $B^4$ carries web plates D $D^1$ reinforced by stiffening plates $D^2$ $D^3$. These web plates have removably bolted to them axle housings $D^4$ $D^5$, which axle housings are supported by means of stirrups $D^6$, in this case from the vehicle dead axle $D^7$. Each web plate carries a cross-head guide $D^8$ $D^9$ in which is mounted for horizontal movement a cross head $D^{10}$ $D^{11}$, which cross head includes a ball bearing in which is mounted for rotation drive shafts $D^{12}$ or $D^{13}$ as the case may be, which drive shafts by means, not here specifically illustrated, each separately drive one of the front wheels of the automobile.

Each of the drive shafts $D^{12}$ $D^{13}$ carries an internal external gear E $E^1$, which gears are respectively in mesh with the pinions $B^9$ $B^{10}$, as indicated; when $B^9$ is in mesh with the external gear E, $B^{10}$ is in mesh with the internal gear $E^1$ and vice versa, thus the turbine shafts rotating in opposite directions cause rotation of the drive shafts $D^{12}$ $D^{13}$ in the same direction. This relationship between the gears E $E^1$, $B^9$ $B^{10}$ is maintained by means of a reverse shaft $E^2$ socketed at each end and mounted for rotation on the web plates D $D^1$. $E^3$ is a control arm keyed to the reverse shaft $E^2$ adapted to be manipulated by any suitable power transmitting mechanism by the operator to maintain the parts either in forward, reverse, or if desired neutral positions. Mounted on each end of the shaft $E^2$ are cam arms $E^4$ $E^5$ carrying reverse cams $E^6$ $E^7$. These cams are closed cams having yoke ends to engage pins $E^8$ $E^9$ projecting laterally from the plungers $E^{10}$ $E^{11}$, which plungers are pinned to the cross heads. It will be noted that the cams are so disposed that whichever way the shaft $E^2$ is rotated, the plungers move in oppposite directions so as to always give the desired relation between the pinions $B^9$ $B^{10}$ and the internal external gears E $E^1$. $E^{12}$ $E^{12}$ are slight depressions in the walls of the cams into which the pins $E^8$ may drop so as to tend normally to lock them slightly in position and resist displacement.

Figure 3 shows in full lines the pinion in mesh with the external gear and in dotted lines the pinion in mesh with the internal gear. Figure 4 shows the inner cam in full lines and the far cam in dotted lines. Figure 6 shows the relation diagrammatically of the two pairs of gears and pinions, the full lines showing the position for forward movement, the dotted lines the position for reverse.

G is a liquid fuel supply pipe leading from the tank $A^4$ to the priming tank $G^1$. $G^2$ is a liquid fuel supply pipe leading from the priming tank $G^1$ to the suction side of the pump $G^3$ associated with the turbine. This supply or suction pipe $G^2$ has interposed between its ends a pressure control valve $G^4$ which, responsive to the pressure in the generator, controls the flow of liquid fuel. $G^5$ is a separate throttle valve controlled by the foot lever $G^6$ which separately controls the rate at which fuel may be sucked from the supply tank to the pump. $G^7$ is the fluid pressure pipe. It leads from the exhaust side of the pump $G^3$ to the generator $A^7$ to supply to the generator the proper amount of liquid fuel to be vaporized therein. $G^8$ is the combustion chamber of the generator. It has a spark plug $G^9$ adapted to be energized from a battery $G^{10}$ to assist ignition in the combustion chamber when and if that is necessary.

H is a hand pump associated with the priming tank $G^1$. The tank $G^1$ is always full because the fuel is sucked from the tank $A^4$ through the pipe G and through it. When the pump H has been manipulated the fuel is forced out through the pipe $H^1$ to the combustion chamber and through the pipe $H^2$ and pipe $H^3$ to the generator. When the turbine is in operation, the pump $G^3$ draws combustible liquid from the tank $A^4$ and forces it into the generator where it is vaporized and pressure developed. The vapor rushes out from the generator through the pipe $C^8$ and the turbine to cause operation of the turbine to drive the vehicle. The exhaust gas from the turbine returns through the conduit $H^4$ to the generator, being mixed with air enroute to support combustion and furnishes the heat to vaporize the incoming liquid fuel to cause a continued cycle of operation. The automatic pressure control valve $G^4$ limits the amount of fuel that can be drawn in by the pump in consonance with the pressure developed by the generator. The maximum amount of fuel fed to the generator is controlled by the turbine rotation because the pump is driven by the turbine. When a lesser amount of fuel is necessary for operation, the fuel supply is limited to that amount because as pressure builds up in the generator, the amount of fuel drawn from the tank by the pump is controlled and since the generator is a flash generator, only a relatively minute amount of liquid is in the generator at any one time. Checking or choking the supply of fuel to the generator, exerts an instant control on generator turbine conditions. When the apparatus is applied to an automotive vehicle, it frequently is desirable to travel at less than maximum speed or to have the engine or turbine developing less than maximum power. The foot operated throttle working also on the liquid fuel suction pipe serves to regulate the amount of liquid fuel fed to the generator and so the power developed by the turbine and generator independent of limitations imposed by the automatic governor control valve.

I claim:

1. In an automotive vehicle, an elastic fluid turbine having a plurality of separate turbine wheels mounted for independent rotation in opposite directions, means for supplying motive fluid to one of them, the second being adapted to receive its motive fluid from the first, a separate power transmission means between each turbine wheel and a separate vehicle wheel adapted to cause rotation of the vehicle wheels in the same direction responsive to the opposite directional rotation of the turbine wheels, and reverse mechanism for simultaneously changing the direction of rotation of the vehicle wheels relative to the respective turbine wheels.

2. In an automotive vehicle, an elastic fluid turbine having a plurality of separate turbine wheels mounted for independent rotation in opposite directions, means for supplying motive fluid to one of them, the second being adapted to receive its motive fluid from the first, a separate power transmission means between each turbine wheel and a separate vehicle wheel adapted to cause rotation of the vehicle wheels in the same direction responsive to the opposite directional rotation of the turbine wheels and means for changing the driving relation between each turbine wheel and its associated vehicle wheel to cause reverse drive.

3. In an automotive vehicle, an elastic fluid turbine having a plurality of separate turbine wheels mounted for independent rotation in opposite directions, means for supplying motive fluid to one of them, the second being adapted to receive its motive fluid from the first, separate power transmission means between said turbine wheels and separate parts of the vehicle running gear whereby the power of each wheel is applied to the running gear in the same direction.

4. In an automotive vehicle, a pair of independently mounted and supported road engaging wheels, separate drive shafts for each wheel, a gear associated with the inboard end of each drive shaft, the gears being arranged side by side, and generally concentric, a turbine housing interposed between said gears containing two turbine wheels adapted for rotation in opposite directions, means for supplying motive fluid to one of said turbine wheels and through it to the other to cause such opposite rotation of the turbine wheels, separate shafts upon which each turbine wheel is mounted and gears on said shafts in mesh respectively with one of the gears associated with the vehicle wheels.

5. In an automotive vehicle, a pair of independently mounted and supported road engaging wheels, separate drive shafts for each wheel, a gear associated with the inboard end of each drive shaft, the gears being arranged side by side, and generally concentric, a turbine housing interposed between said gears containing two turbine wheels adapted for rotation in opposite directions, means for supplying motive fluid to one of said turbine wheels and through it to the other to cause such opposite rotation of the turbine wheels, separate shafts upon which each turbine wheel is mounted and gears on said shafts in mesh respectively with one of the gears associated with the vehicle wheels, and means for simultaneously and in opposition changing the relation between each turbine shaft and its associated wheel shaft to reverse the vehicle.

6. In an automotive vehicle, a pair of independently mounted and supported road engaging wheels, separate drive shafts for each wheel, a gear associated with the inboard end of each drive shaft, the gears being arranged side by side, and generally concentric, a turbine housing interposed between said gears containing two turbine wheels adapted for rotation in opposite directions, means for supplying motive fluid to one of said turbine wheels and through it to the other to cause such opposite rotation of the turbine wheels, separate shafts upon which each turbine wheel is mounted and gears on said shafts in mesh respectively with one of the gears associated with the vehicle wheels, and means for simultaneously and in opposition changing the relation between each turbine shaft and its associated wheel shaft to reverse the vehicle, said means comprising levers associated with the wheel shafts whereby the shafts may be transversely displaced in opposite directions, each gear comprisng an internal and external gear, the gears being arranged so that one internal and one external gear is always in mesh with the two gears driven by the turbine.

7. In an automotive vehicle, an elastic fluid turbine having a plurality of separate turbine wheels mounted for independent rotation in opposite directions, means for supplying motive fluid to a first turbine wheel and through it to a second turbine wheel, separate shafts for said first and second turbine wheels, running gear for the vehicle including a pair of substantially coaxial driving axles, and driving gears connecting the turbine wheel shafts and driving axles, respectively, the driving axles being geared to the respective turbine wheel shafts on opposite sides of the axis of rotation thereof whereby both driving axles are rotated in the same direction.

8. In combination, two pairs of concentric gears, the gears of each pair being one internal, the other external, driven shafts supporting said gears, a pair of turbine wheels, separate shafts, one for each wheel, means for supplying motive fluid to one of said wheels and guiding it from such wheel to the other to drive said wheels in opposite directions, drive shafts associated with said turbine wheels and driven by them in opposite directions, gears on said drive shafts in opposition to the two pairs of gears first mentioned and means for displacing the turbine driven gears and the driving shaft supported gears with respect to one another to change the direction of drive of the driven shafts in unison.

9. In combination, two pairs of concentric gears, the gears of each pair being one internal, the other external, driven shafts supporting said gears, a pair of turbine wheels, separate shafts, one for each wheel, means for supplying motive fluid to one of said wheels and guiding it from such wheel to the other to drive said wheels in opposite directions, drive shafts associated with said turbine wheels and driven by them in opposite directions, gears on said drive shafts in opposition to the two pairs of gears first mentioned and means for displacing the turbine driven gears and the driving shaft supported gears with respect to one another to change the direction of drive of the driven shafts in unison, said means comprising supporting members for said driven shafts and their associated gears and means for displacing said members in a direction generally perpendicular to the axes of the driven shaft.

CHARLES W. DAKE.